W. H. RUTAN.
Harness-Pads.
No. 133,338.           Patented Nov. 26, 1872.
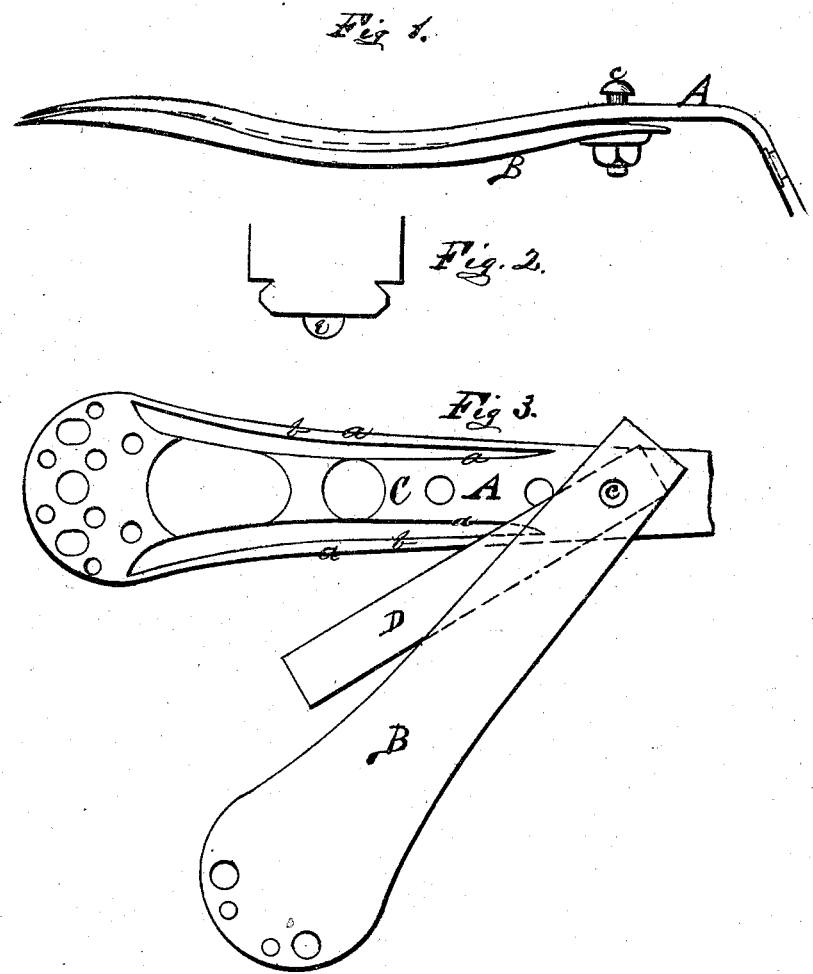
Witnesses
Oliver Drake
Thomas Paulin
Inventor
William H. Rutan
By Drake & Co. Att's

UNITED STATES PATENT OFFICE.

WILLIAM H. RUTAN, OF NEWARK, NEW JERSEY.

IMPROVEMENT IN HARNESS-PADS.

Specification forming part of Letters Patent No. 133,338, dated November 26, 1872.

*To all whom it may concern:*

Be it known that I, WILLIAM H. RUTAN, of Newark, county of Essex and State of New Jersey, have invented certain Improvements in Harness-Pads; and I do, declare the following to be a full, clear, and exact description of the same, reference being had to the accompanying drawing and to the letters of reference marked thereon and forming a part of this specification, in which—

Figure 1 is a sectional view, showing one-half of the plate A and the bottom pad-plate B, &c. Fig. 2 is a section of the inside leather covering where it is joined in the center over the nut which secures the hook. Fig. 3 is an inverted section of the plate A, the spring D, and the bottom plate B; also, the ribs $a\ a$, the channel C, and the rivet $c$.

This invention consists in having the plate A made very light, and strengthened by having two ribs, $a\ a$, on each outer edge, leaving a channel, $b$, between to support and keep in place the bottom pad-plate B, which is formed so as to set in said channels. In the center of the pad-plate A, on the inside, between the inside ribs, is a channel or recess, C, sufficiently broad and deep to receive the nut in which is screwed the terret; said nut resting upon, and being kept in place, by a spring, D, which fits in said channel, and is secured therein by the bolt or rivet $c$, which also secures the bottom pad-plate B. The holes or openings in the pad-plate serve for several purposes, viz., to lighten the plate, and for the reception of the terrets, hooks, bolts, &c., the largest one being sufficiently large to insert and adjust the nuts which secure the terrets and the bolts which hold the loops. The hole E in the top of the plate A is for the reception of the hook which screws into a nut which fits into a recess on the inside of said plate, so that the nut is even with the surface of the plate. The leather covering on the inside or bottom of the pad is so cut (see Fig. 2) and joined in the center of the pad, over said nut, as to obviate the necessity of using the "clout" or separate piece of leather ordinarily used in covering pads, so that the hook and nut may be taken out or adjusted by simply cutting the stitch which secures the ends of the covering in the center and raising said ends which cover the nut.

The chief objects of this invention are to save labor, and at the same time to make a neat, light, and substantial pad.

What I claim as new, and desire to secure by Letters Patent, is—

1. In a coach-pad, the plate A, when constructed with ribs $a\ a$, to receive the plate B, substantially as herein set forth.

2. The combination of plate A, having ribs $a\ a$ and channel C, with spring D and plate B, all constructed and arranged as set forth.

WILLIAM H. RUTAN.

Witnesses:
OLIVER DRAKE,
THOMAS PAULIN.